(12) United States Patent
Parker et al.

(10) Patent No.: US 11,144,458 B2
(45) Date of Patent: Oct. 12, 2021

(54) APPARATUS AND METHOD FOR PERFORMING CACHE MAINTENANCE OVER A VIRTUAL PAGE

(71) Applicant: ARM LIMITED, Cambridge (GB)

(72) Inventors: Jason Parker, Sheffield (GB); Bruce James Mathewson, Papworth Everard (GB); Matthew Lucien Evans, Cambridge (GB)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 15/549,284

(22) PCT Filed: Jan. 12, 2016

(86) PCT No.: PCT/GB2016/050064
§ 371 (c)(1),
(2) Date: Aug. 7, 2017

(87) PCT Pub. No.: WO2016/139444
PCT Pub. Date: Sep. 9, 2016

(65) Prior Publication Data
US 2018/0032435 A1    Feb. 1, 2018

(30) Foreign Application Priority Data

Mar. 3, 2015   (GB) ...................... 1503580

(51) Int. Cl.
*G06F 12/00*     (2006.01)
*G06F 12/0831*   (2016.01)
(Continued)

(52) U.S. Cl.
CPC .......... *G06F 12/0833* (2013.01); *G06F 12/10* (2013.01); *G06F 12/1009* (2013.01);
(Continued)

(58) Field of Classification Search
CPC ............ G06F 12/0814; G06F 12/0831; G06F 12/0833
See application file for complete search history.

(56) References Cited

U.S. PATENT DOCUMENTS

| 6,978,357 B1 * | 12/2005 | Hacking | ............. | G06F 12/0804 711/133 |
| 2002/0069331 A1 * | 6/2002 | Chauvel | .................. | G06F 1/206 711/144 |

(Continued)

FOREIGN PATENT DOCUMENTS

| CN | 1620649 A | 5/2005 |
| CN | 101421706 A | 4/2009 |

(Continued)

OTHER PUBLICATIONS

International Search Report and Written Opinion of the ISA for PCT/GB2016/050064, dated Mar. 16, 2016, 12 pages.

(Continued)

*Primary Examiner* — Reginald G Bragdon
*Assistant Examiner* — Michael L Westbrook
(74) *Attorney, Agent, or Firm* — Nixon & Vanderhye, P.C.

(57) ABSTRACT

An apparatus (2) comprises processing circuitry (4) for performing data processing in response to instructions. The processing circuitry (4) supports a cache maintenance instruction (50) specifying a virtual page address (52) identifying a virtual page of a virtual address space. In response to the cache maintenance instruction, the processing circuitry (4) triggers at least one cache (18, 20, 22) to perform a cache maintenance operation on one or more cache lines for which a physical address of the data stored by the cache line is within a physical page that corresponds to the virtual (Continued)

page identified by the virtual page address provided by the cache maintenance instruction.

11 Claims, 6 Drawing Sheets

(51) Int. Cl.
  *G06F 12/1009* (2016.01)
  *G06F 12/10* (2016.01)
(52) U.S. Cl.
  CPC .. *G06F 12/0831* (2013.01); *G06F 2212/1016* (2013.01); *G06F 2212/655* (2013.01); *Y02D 10/00* (2018.01)

(56) References Cited

U.S. PATENT DOCUMENTS

| | | | |
|---|---|---|---|
| 2004/0158681 A1* | 8/2004 | Hooker | G06F 9/3004 711/143 |
| 2007/0005932 A1 | 1/2007 | Covelli et al. | |
| 2009/0019232 A1 | 1/2009 | Deshpande et al. | |
| 2009/0083496 A1* | 3/2009 | Stevens, Jr. | G06F 12/0808 711/144 |
| 2009/0157981 A1 | 6/2009 | Kinter et al. | |
| 2011/0153952 A1* | 6/2011 | Dixon | G06F 12/0891 711/135 |
| 2014/0019691 A1* | 1/2014 | Dally | G06F 12/0895 711/144 |
| 2014/0201494 A1 | 7/2014 | Venkumahanti et al. | |
| 2017/0192886 A1* | 7/2017 | Boehm | G06F 12/0804 |

FOREIGN PATENT DOCUMENTS

| | | |
|---|---|---|
| CN | 101615133 A | 12/2009 |
| CN | 102117247 A | 7/2011 |
| CN | 103282877 A | 9/2013 |
| CN | 103455443 A | 12/2013 |
| CN | 104272279 A | 1/2015 |
| JP | H03-231345 | 10/1991 |
| JP | 2001-134490 | 5/2001 |
| JP | 2009-140376 | 6/2009 |
| JP | 2012-530979 | 12/2012 |

OTHER PUBLICATIONS

Search Report for GB 1503580.1, dated Sep. 29, 2015, 3 pages.
Office Action for EP Application No. 16701195.6 dated Oct. 8, 2019, 7 pages.
"Summons to Attend Oral Proceedings" received in the corresponding foreign European Appln No. 16 701 195.6-1203 dated May 29, 2020, 10 pages.
Office Action for Japanese Application No. 2017-545291 dated Oct. 29, 2019 and English translation, 7 pages.
Office Action in corresponding Japanese Patent Application No. 2017-545291 dated Sep. 10, 2020, with English translation, 4 pages.
Office Action issued Chinese Patent Application No. 201680012407.3 dated Aug. 25, 2020, English Translation 10 pgs.
Office Action in Chinese Patent Application No. 201680012407.3 dated Mar. 16, 202, total 12 pages with translation.
Office Action in Great Britain Patent Application No. GB1503580.1 dated Mar. 15, 2021, total 4 pages.

* cited by examiner

APPARATUS AND METHOD FOR PERFORMING CACHE MAINTENANCE OVER A VIRTUAL PAGE

This application is the U.S. national phase of International Application No. PCT/GB2016/050064 filed 12 Jan. 2016, which designated the U.S. and claims priority to GB Patent Application No. 1503580.1 filed 3 Mar. 2015, the entire contents of each of which are hereby incorporated by reference.

BACKGROUND

The present technique relates to the field of data processing. More particularly, it relates to cache maintenance operations.

An apparatus may have one or more caches for storing cached versions of data from memory, so that the cached data can be accessed more quickly by processing circuitry than if the data had to be fetched from memory. There may be several caches within the apparatus and sometimes cache maintenance operations may be performed, for example to make consistent different versions of data corresponding to the same address.

SUMMARY

At least some embodiments provide an apparatus comprising:

processing circuitry to perform data processing in response to instructions;

wherein in response to a cache maintenance instruction specifying a virtual page address identifying a virtual page of a virtual address space, the processing circuitry triggers at least one cache to perform a cache maintenance operation on one or more cache lines for which a physical address of data stored by the cache line is within a physical page that corresponds to the virtual page identified by the virtual page address;

wherein the cache maintenance instruction specifies one of a plurality of virtual page sizes, and the processing circuitry is responsive to the cache maintenance instruction to trigger the at least one cache to perform the cache maintenance operation with the virtual page having the virtual page size specified by the cache maintenance instruction.

At least some embodiments provide an apparatus comprising:

processing means for performing data processing in response to instructions;

wherein in response to a cache maintenance instruction specifying a virtual page address identifying a virtual page of a virtual address space, the processing means triggers at least one cache to perform a cache maintenance operation on one or more cache lines for which a physical address of data stored by the cache line is within a physical page that corresponds to the virtual page identified by the virtual page address;

wherein the cache maintenance instruction specifies one of a plurality of virtual page sizes, and the processing means is responsive to the cache maintenance instruction to trigger the at least one cache to perform the cache maintenance operation with the virtual page having the virtual page size specified by the cache maintenance instruction.

At least some embodiments provide a method of data processing comprising:

receiving a cache maintenance instruction specifying a virtual page address identifying a virtual page of a virtual address space; and in response to the cache maintenance instruction, triggering at least one cache to perform a cache maintenance operation on one or more cache lines for which a physical address of data stored by the cache line is within a physical page that corresponds to the virtual page identified by the virtual page address;

wherein the cache maintenance instruction specifies one of a plurality of virtual page sizes, and in response to the cache maintenance instruction, the at least one cache is triggered to perform the cache maintenance operation with the virtual page having the virtual page size specified by the cache maintenance instruction.

BRIEF DESCRIPTION OF THE DRAWINGS

Further embodiments, examples and features will be described below in conjunction with the accompanying drawings in which.

DESCRIPTION OF EXAMPLES

Figure 1:
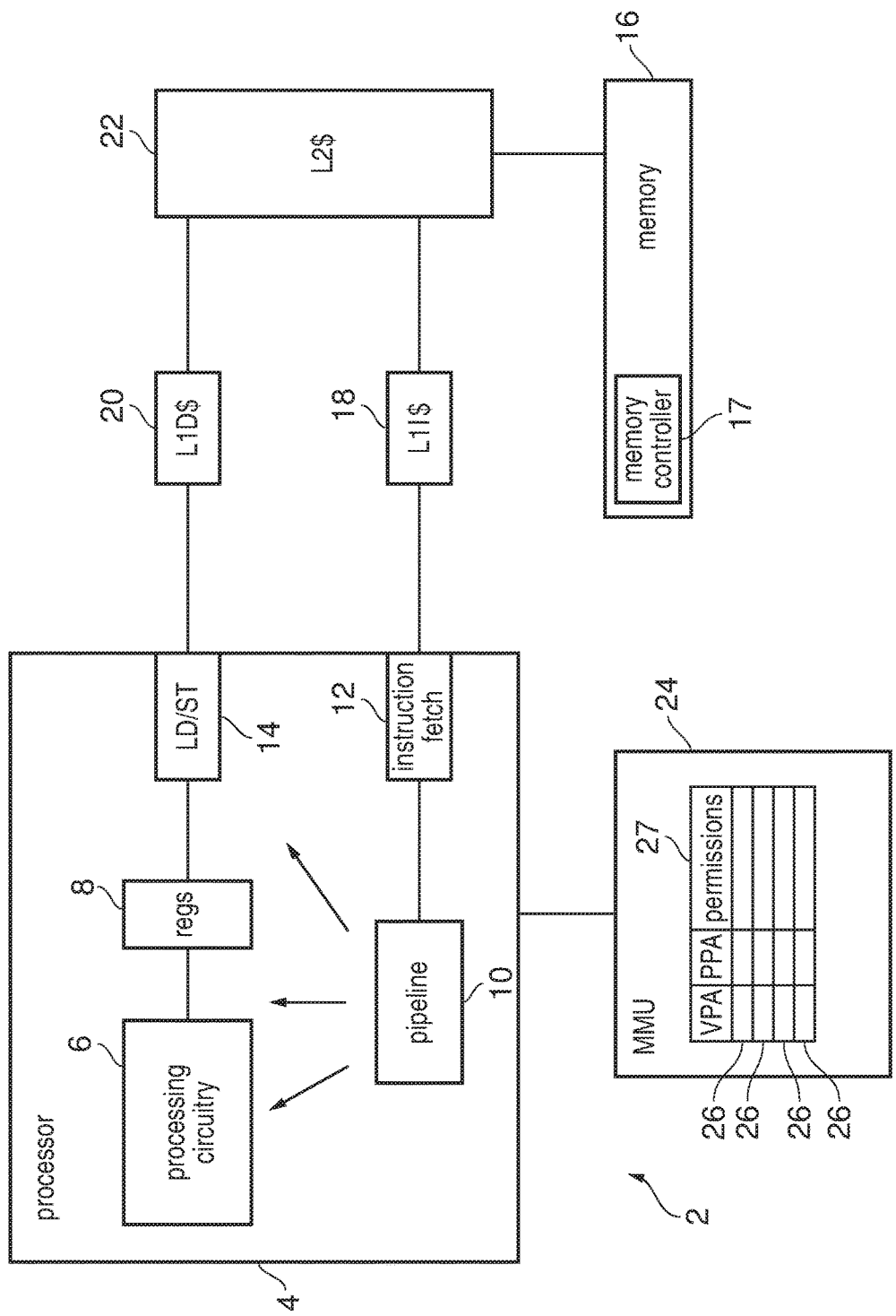
FIG. 1 schematically illustrates a data processing apparatus having processing circuitry and a cache.

An apparatus may have processing circuitry for performing data processing in response to instructions. The processing circuitry may have access to at least one cache from which data can be accessed more quickly than the corresponding data from memory. There may for example be several levels of cache in a cache hierarchy. Sometimes it may be required to perform cache maintenance operations on certain cache lines within one or more caches. For example the cache maintenance operations may be performed to maintain consistency between the cached data and corresponding data in a memory or another cache.

The processing circuitry supports a cache maintenance instruction which specifies a virtual page address identifying a virtual page of a virtual address space. The virtual addresses are the addresses which are used by the processing circuitry to refer to data, as opposed to physical addresses used by a memory. In response to the cache maintenance instruction, the processing circuitry may trigger at least one cache to perform a cache maintenance operation on any cache lines for which a physical address of the data stored by that cache line is within a physical page that corresponds to the virtual page identified by the virtual page address specified in the instruction. In systems comprising more than one cache, the cache lines for which the cache maintenance is performed may all be within the same cache, or could be within two or more of the caches—this will depend on which addresses have data stored in each cache.

By providing a cache maintenance instruction which triggers cache maintenance to be performed for an entire virtual page of addresses, this may provide several advantages over alternative approaches such as executing individual cache maintenance instructions for each virtual address for which cache maintenance is to be performed. Firstly, the number of instructions executed can be reduced, reducing the burden on the processing circuitry and allowing a greater throughput of other instructions. Also, it allows higher level system software intention to be expressed to the fabric and components within the apparatus, which may allow performance optimizations which may not be possible when individual cache maintenance instructions are executed for each address, since with the address based approach the system cannot tell from the individual instructions that a larger range of addresses will require cache maintenance. Also, by using a single instruction to trigger cache maintenance over an entire page of the virtual address space, the maintenance operations may be performed atomically without needing locks or other status tracking operations to be performed by the processing circuitry, reducing the overhead of maintaining data coherence. Operating system pre-emption during cache operations may also be handled transparently to software.

The cache maintenance instruction may specify one of a number of virtual page sizes, so that when executed the processing circuitry controls the cache to perform the cache maintenance operation for a block of addresses of the specified page size. This allows the programmer or a compiler to select a cache maintenance instruction specifying a virtual page size that best matches the required range of addresses, to avoid unnecessarily applying cache maintenance to a much larger range of addresses than is really needed, reducing the maintenance overhead at the cache. The virtual page size may be specified in different ways by the instruction. In some examples, the page size may be implicit in the instruction opcode (so that essentially different instructions are provided for each page size). Alternatively, a common opcode could be used but an immediate field may specify the virtual page size to be used, or the instruction could specify a register which stores a value indicating the virtual page size to be used.

The processing circuitry may have translation circuitry, such as a translation lookaside buffer (TLB) or a memory management unit (MMU), for translating virtual page addresses into physical page addresses. For example the translation circuitry may have a number of translation entries with each entry corresponding to a particular virtual page address and identifying the corresponding physical page address for that virtual page address. That is, a "page" of memory may refer to the unit of the memory address space corresponding to one translation entry, so that the same virtual-to-physical address translation is applied to all addresses within the same page, while different virtual-to-physical address translations may be used for addresses in different pages. Hence, another advantage of providing a cache maintenance instruction which identifies the addresses for which cache maintenance is required using a virtual page address is that only a single lookup of the translation circuitry may be required, rather than multiple lookups for each address which would be required if separate cache maintenance instructions were executed for each address. Translation table lookups can be relatively slow especially if translation table walks are required in order to find the virtual-to-physical address mapping required, so by reducing the overhead of address translation the virtual page address based cache maintenance instruction can improve performance.

Various cache maintenance operations could be performed on the addresses within the specified virtual page, in response to the cache maintenance instruction. For example the cache maintenance operation may in general comprise an operation for changing the coherency status of cached data, for ensuring consistency between different versions of data within the system, or for placing parts of the cache in some known state so that other operations may continue with a predictable operation. For example the cache maintenance operation may include any of the following:

a clean operation to write dirty data to at least one further data store (which may be a cache at another level of the cache hierarchy or a memory). Dirty data may be data which has been modified without updating a corresponding copy of data in another location. The further data store(s) to which the dirty data is to be written during a clean operation may be predetermined or hardcoded, or could be variable, for example being defined using a control parameter in a control register.
  an invalidate operation to invalidate data from the specified addresses (e.g. by marking the data as invalid, and/or deleting the data from the cache). An invalidate operation may cause dirty data to be lost if it has not yet been written back to a further data store.
  a clean and invalidate operation which is equivalent to performing the clean operation followed by an invalidate operation. This allows data in the cache to be invalidated while still retaining any previously modified dirty data by first writing this dirty data to memory or another data store.
  a setting operation to set the data at the required addresses to a predetermined value (such as zero, for example).

Some systems may only implement one type of cache maintenance operation, while others may implement several types. For example, several different versions of the cache maintenance instruction may be provided for each type of cache maintenance operation, with each version using a virtual page address to identify the addresses for which cache maintenance is to be performed. The particular cache maintenance operation to be performed may be identified by the instruction opcode, or by a field within the instruction encoding.

The virtual page address may not be the only way in which the processing circuitry allows addresses for cache maintenance to be identified. For example, the processing circuitry may also support cache maintenance instructions which specify an individual virtual address for which a cache maintenance operation is to be applied, or which specify that cache maintenance should be performed for a cache as a whole.

There are a number of ways of implementing the processing of the cache maintenance instruction within the apparatus. In one example, in response to the cache maintenance instruction the processing circuitry may trigger issuing of cache maintenance commands to the cache where each command specifies a physical address within the physical page that corresponds to the virtual page address specified by the cache maintenance instruction. In response to each individual cache maintenance command, the cache may then perform a cache maintenance operation on the specified physical address. This may simplify the cache design so that a standard cache which can already deal with cache maintenance commands for individual addresses does not need any hardware modification to handle virtual page based cache maintenance. For example, a small state machine within the processing circuitry can convert the cache maintenance instruction into individual micro-operations for each address.

Alternatively, the cache may be issued with at least one cache maintenance command which specifies a block of physical addresses within the physical page corresponding to the virtual page address specified by the cache maintenance instruction. In response to each command, the cache may identify which cache lines store data for physical addresses within the specified block of addresses, and perform the cache maintenance operation on the identified cache lines. This approach can reduce the number of commands which need to be sent to the cache, saving command bandwidth and reducing the burden on the processing circuitry.

In some cases, the block of physical addresses identified by the cache maintenance command could be the entire page so that the cache maintenance instruction triggers a single cache maintenance command to control the cache to apply maintenance over the entire page.

Alternatively, for at least some cache maintenance instructions, several commands could be issued to the cache each specifying a block of addresses which is smaller than the total page size. This approach may be particularly useful for simplifying the cache hardware when the processing circuitry supports different page sizes as discussed above. For example, regardless of the page size selected by the cache maintenance instruction, the instruction could be mapped to cache maintenance commands corresponding to a certain base unit of addresses, so that the cache does not need to consider the specific page size and simply processes one or more commands of a certain fixed size block of addresses.

There are different ways in which the cache could respond to a cache maintenance command specifying a block of addresses. One approach may be to iterate through each address within the specified block with a separate lookup of the cache for each address to check whether there are any cache lines which store data corresponding to that address. However, this approach may have a relatively significant overhead since often the page size may be significantly larger than the number of locations within the cache and so repeatedly looking up the cache for each address may be slow and energy intensive.

Therefore, a more efficient approach may be for the cache to iterate through each cache line of the cache, and, for each cache line, check whether the cache line stores data for any physical address within the block specified by the cache maintenance command. Since the physical page addresses within the same page or same block of addresses will typically share the same value for a certain number of bits of the address, in practice it may not be necessary to perform a separate address comparison for each address in the range. Instead, the cache can simply lookup each cache line once, to compare at least a portion of the tag of the cache line against the common portion of the addresses in the required block, to identify whether the cache line stores data from any address within that block. The cache lines for which a match is found can be recorded, and cache maintenance operations can be initiated for the matching cache lines.

Sometimes the cache may be sent several cache maintenance commands. This may either because one cache maintenance instruction was split into several commands specifying different blocks of addresses within the same page, or because several different instructions were executed by the processing circuitry for different pages. To reduce the number of times the cache tags are looked up, several cache maintenance commands may be handled by the cache together so that with a single lookup of the cache tags, the tags can be compared against the addresses specified in several cache maintenance commands, to determine which cache lines store data for any of the blocks of addresses specified by the multiple commands. By reducing the number of tag lookups, energy consumption can be reduced and performance can be improved.

When looking up cache lines to determine whether they store data corresponding to the specified page, in some cases the cache may not need to lookup all the cache lines. For example, some systems may maintain some information to track which data is stored in which cache, in which cases the lookups may not be required for lines which are known not to store data corresponding to the required page of addresses.

For example, some systems having multiple caches may provide a snoop filter which stores data identifying which caches store data for corresponding physical addresses. In this case, the snoop filter can be used to identify which caches store data for the required virtual page of addresses, and control circuitry may prevent transmission of cache maintenance commands to caches other than those caches identified by the snoop filter. This helps to reduce energy consumption and improves performance by avoiding unnecessary cache lookups of caches known not to be storing data from the required addresses, and by reducing the number of cache maintenance commands which are routed by the interconnect fabric, to free up bandwidth for other commands.

In some cases, a memory controller associated with a memory may be able to locally process some cache maintenance commands. For example, in the case of setting a page of addresses to a predetermined value such as zero, the memory may be able to process the zero setting command itself (in parallel with commands sent to the cache to zero any corresponding values in the cache). By processing some cache maintenance commands within the memory controller, this may allow the cache maintenance operation to be performed faster than if the command was directed only to the cache with subsequent write backs being performed to update the corresponding data in memory.

FIG. 1 schematically illustrates a data processing apparatus 2 including a processor 4 comprising processing circuitry 6 for performing data processing operations using data values stored in registers 8. For example, the processing circuitry 6 may include an arithmetic logic unit (ALU) including various adders, shifters, multipliers, etc for performing arithmetic operations on values stored in the registers 8 to generate a result value which is written back to the registers 8. An instruction pipeline 10 controls the processing circuitry 6 to perform the data processing in response to program instructions fetched from a memory system by an instruction fetch unit 12. The fetched instructions proceed through various stages of the pipeline 10. For example the pipeline stages may include a decode stage for decoding the instructions to generate control signals for controlling the processing circuitry 6, and an issue stage for controlling when instructions are issued to the processing circuitry 6 for execution. In some examples the pipeline may support out of order processing and may include a rename stage for performing register renaming. The pipeline may also control a load/store unit 14 to load values from the memory system into the registers 8 or store data values from the registers 8 to the memory system, in response to load/store instructions.

It will be appreciated that the processor 4 may include other elements not shown in FIG. 1.

The memory system includes main memory 16 as well as a number of caches arranged in a hierarchical structure. The memory 16 has a memory controller 17 for controlling memory access operations. In this example, the caches include a level one (L1) instruction cache 18 for caching instructions to be fetched by the fetch unit 12, a L1 data cache 20 for caching data from memory 16, and a shared level two (L2) cache for caching data and instructions. The L2 cache 22 provides faster access to a certain subset of data or instructions from the memory 16, but has a smaller capacity than main memory 16. The L1 caches 18, 20 provide faster access to a subset of data or instructions from the L2 cache 22 or memory 16, but have a smaller capacity than the L2 cache 22. Various caching policies may be used to determine what data or instructions should be placed in the L1 and L2 caches 18, 20, 22, depending on usage of data by the processor 4. Some policies may require that all data or instructions within the L1 caches 18, 20 should also be cached in the L2 cache 22, whereas other policies may allow data or instructions not in the L2 cache 22 to be present in the L1 cache 18, 20. Again, the arrangement shown in FIG. 1 is just an example, and other systems may have other arrangements or numbers of levels of caches.

The instructions executed by the pipeline 10 specify virtual addresses while at least the memory 16 of the memory system identifies data using physical addresses (the caches 18, 20, 22 may be physically addressed or virtually addressed). This allows programs written with the same virtual addresses to co-exist with the virtual addresses used by each program mapping to a different range of physical addresses. A memory management unit (MMU) 24 is provided for translating virtual addresses into physical addresses. The memory management unit 24 includes a table including a number of translation entries 26. Each translation entry 26 identifies a virtual page address (VPA), a corresponding physical page address (PPA) and data 27 defining access permissions for the corresponding page of an address space. To provide different virtual-to-physical address mappings or permissions for different programs or contexts, in some cases the MMU 24 may maintain multiple tables for each program or context, or may load in different entries of the table when there is a change of program or context. When a load/store instruction or other instruction specifying a virtual address is executed by the load/store unit 14, then the MMU 24 checks the access permissions 27 to determine whether the access is permitted, and if so, returns the physical page address 26 corresponding to a virtual page address specified by the instruction and then this physical page address can be used to perform the access to caches or memory.

Figure 4:
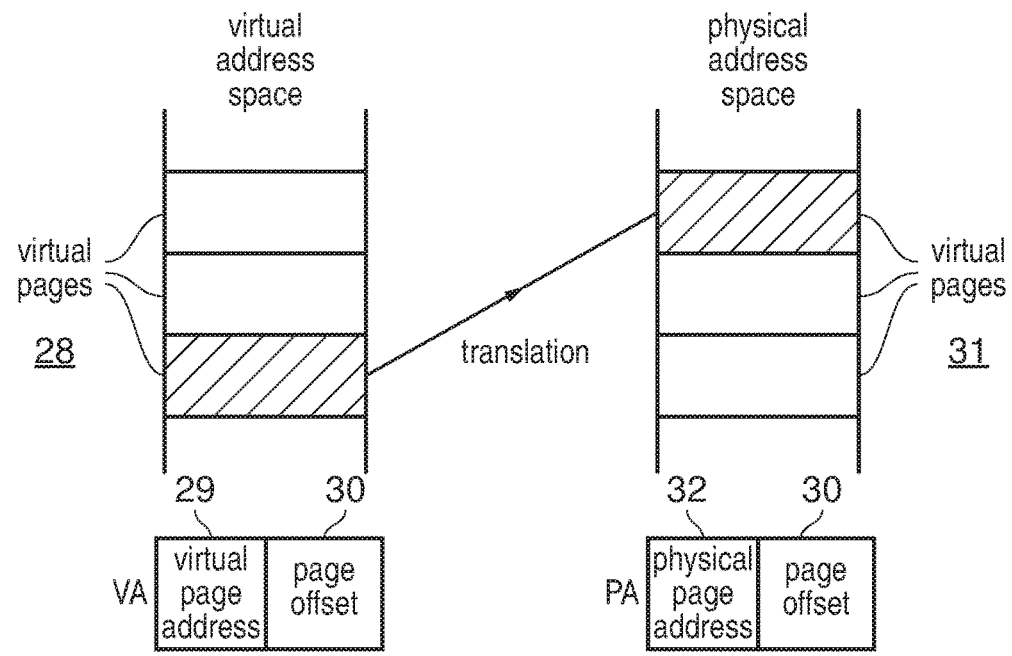
FIG. 4 shows an example of translation between a virtual page address and a physical page address.

For example, FIG. 4 shows an example of the address translation performed by the MMU 24. A virtual address space as seen by software executed by the processor 4 includes a number of virtual pages 28 each corresponding to a certain range of virtual addresses which share the same virtual page address 29. As shown at the bottom of FIG. 4, the virtual page address 29 corresponds to a most significant portion of the virtual address. The least significant portion of the virtual address identifies a page offset 30 specifying a particular address within the page 28. Different page sizes can be implemented by providing different numbers of bits for the virtual page address 29 and page offset 30 respectively. In contrast, the memory system uses addresses within a physical address space comprising a number of physical pages 31. To translate a virtual address into a physical address, the MMU 24 looks up the entry 26 of the translation table corresponding to the virtual page address 29 and returns the corresponding physical page address 32, but the page offset 30 of the address remains unchanged. Therefore, as shown in FIG. 4, the translation effectively maps a virtual page of addresses to a corresponding physical page of addresses—a "page" refers to the granularity at which the translation table applies the address translation. In some cases, the MMU 24 may only have space for entries for a certain number of pages. If the processor 4 accesses an address for which there is no page entry in the table, then an entry can be loaded from memory 16 or from further page tables, by performing a page table walk for example.

Figure 2:
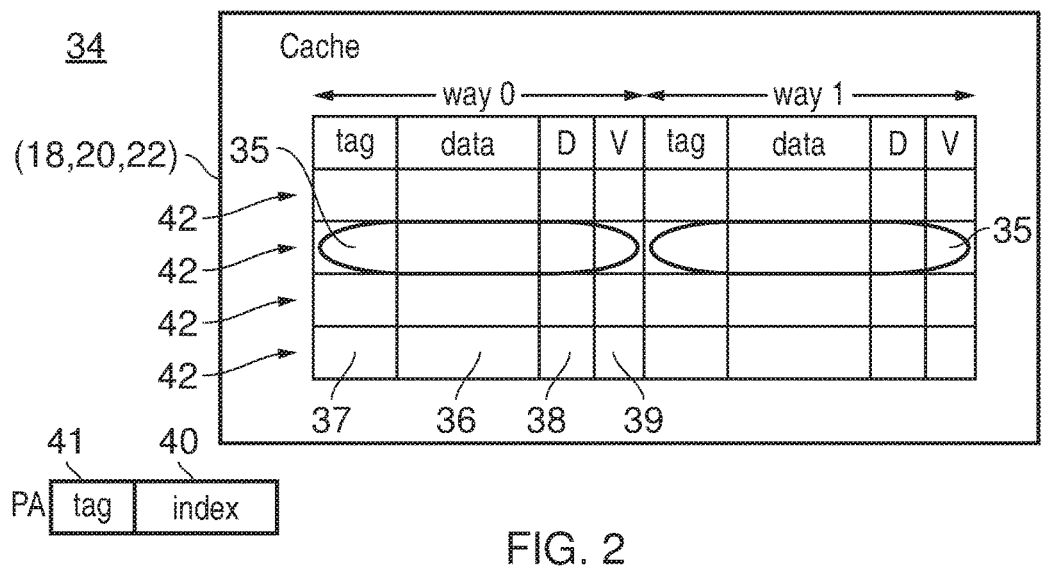
FIG. 2 shows an example of a cache.

FIG. 2 shows an example of a cache 34 which may be any of the caches 18, 20, 22 shown in FIG. 1. The cache may include a number of storage locations, known as cache lines 35. In this example, each cache line 35 stores a data value 36 (which may be an instruction in the case of the instruction cache 18), a tag value 37, a dirty flag 38 indicating whether the data in that cache line is clean or dirty and a valid flag 39 indicating whether the data in that cache line is valid or invalid. In this example, the cache has a set-associative structure (although it will be appreciated that fully associative or direct mapped caches could also be provided). This means that each data value may be placed in one of a corresponding set 42 of cache lines 35 within the cache selected based on the address of the data value, and cannot be placed in other cache lines 35. In this example, the cache 34 is two-way set-associative, which means there are two possible locations in which each data value can be placed, although other caches may have greater associativity. Each physical address includes an index portion 40 which is used to select the corresponding set 42 of cache lines, and when data 36 is stored to a particular cache line 35 then a tag portion 41 of the address is recorded as the tag value 37 of that cache line 35 to identify which data value is stored in the cache line 35. When searching the cache for a particular address, the tag portion 41 of the address is compared against the tags 37 of each cache line 35 of the corresponding set 42 to check whether the required data is stored in the cache. If the data is not already stored, and one of the corresponding set 42 of cache lines has its valid flag 39 indicating invalid data, then this cache line can be allocated for storing the required data and when the data is fetched from a higher level cache or memory then the data is placed in the newly allocated cache line. If there are no spare cache lines containing invalid data, then a victim cache line can be selected using any known victim selection policy (e.g. round robin, least recently used), and valid data can be evicted from the victim cache line and, if the dirty flag 38 indicates that the data is dirty, then the data is written back to the higher level cache or memory to make way for the new data. It will be appreciated that some caches may store other information in addition to the information shown in FIG. 2—e.g. an indication of the coherency status of data, or flags showing whether data is secure or non-secure.

Cache maintenance operations may be performed on the data within the cache. For example, cache maintenance operations may ensure consistency between different levels of cache or between a cache and memory. A number of different types of cache maintenance operation may be supported, including for example, a clean operation to write any dirty data values within one or more cache lines to memory or a higher level cache, an invalidate operation to mark one or more cache lines as invalid so that they are now ready for reuse (destroying any dirty data within those cache lines), a clean and invalidate operation to write back dirty data from selected cache lines to memory before invalidating those cache lines, and a setting operation which sets a cache line to a predetermined value (for example zero). In some cases the setting operation may also write back the predetermined value to any higher level cache or memory.

There may be different ways of identifying the cache lines for which cache maintenance operations should be performed. For example:

Operations on the Entire Cache:
  The cache maintenance operation is applied to every location in a particular cache. Typically, this may only be applied to the instruction cache, since often the instruction cache data is read only and can be safely and atomically discarded.

Operations by Cache Line:
  The cache maintenance operation is applied to one cache line specified by the cache maintenance instruction. Operations by cache line are often preferred in multiprocessor coherent memory systems as they are integrate directly into the coherency protocols, such as MESI. For operations by cache line, there are several ways of identifying the cache line:
  Set/Way—Operating on a physical line within the cache structure.
    Set-Way operations are typically used by software to iterate operations over the entire cache. In a multi-processor coherent system, the cache may need to be removed from the coherency regime to ensure no cache lines are automatically changed during this process. These cache cleaning operations are primarily used during CPU initialization and shutdown (power management) code paths, but could be used for other purposes.
  VA (virtual address)—Operating on a single physically addressed cache line determined by the virtual address to physical address translation, in response to an instruction specifying a single virtual address. VA operations are used within the context of coherent shared virtual memory, to ensure all agents of the coherency system correctly observe all changes to memory.

Figure 3:
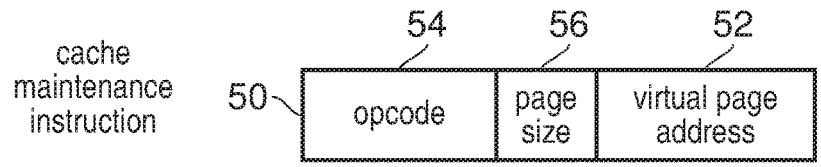
FIG. 3 shows an example of a cache maintenance instruction.

In addition to, or instead of, these types of cache maintenance operation, the present technique also provides the ability to specify that cache maintenance operations should be performed over an entire virtual page 28 of addresses. As shown in FIG. 3, a cache maintenance instruction 50 may specify a virtual page address 52 identifying a virtual page 28 for which cache maintenance is to be applied. In response to the instruction 50, the processing circuitry 6 may trigger any one or more of the caches 18, 20, 22 to perform a cache maintenance operation for any cache line for which the physical address of the data lies the physical page which corresponds to the virtual page identified by the virtual page address 52 specified by the instruction. As shown in FIG. 3, the virtual address based cache maintenance instruction 50 includes an opcode 54 identifying the type of operation to be performed, a page size parameter 56 identifying the particular page size to be used, and a virtual page address 52 specifying the virtual page to which the operations are to be applied. The page size 56 may include an immediate value specifying the page size, or may reference a register 8 storing the page size value or the virtual page address 52. In some cases, the page size 56 may instead be indicated as part of the instruction opcode 54. For the virtual page address 52, the instruction may comprise a register specifier identifying a register which stores the virtual page address. In embodiments where the page address can fit within the instruction encoding (depending on page size), the page address could also be encoded as an immediate value. However, often the virtual page address may be larger than the space available in the instruction encoding for the address specifying field 52, in which case a register specifier may be used.

This allows a whole class of cache maintenance operations to be provided which work upon whole virtually addressed pages rather than cache lines. The following table lists some examples of operations which may be provided:

| Operation by VA | Operation by Virtual 4K Page | Operation by Virtual 16K Page | Operation by Virtual 64K Page | Description |
| --- | --- | --- | --- | --- |
| DCIVAC | DCIV4PPC | DCIV16PPC | DCIV64PPC | Data Cache Invalidate to point Coherency |
| DCIVAU | DCIV4PU | DCIV16PU | DCIV64PU | Data Cache Invalidate to point Unification |
| DCCVAC | DCCV4PC | DCCV16PC | DCCV64PC | Data Cache Clean to point Coherency |
| DCCVAU | DCCV4PU | DCCV16PU | DCCV64PU | Data Cache Clean to point Unification |
| DCCIVAC | DCCIV4PC | DCCIV16PC | DCCIV64PC | Data Cache Clean & Invalidate to point Coherency |
| DCCIVAU | DCCIV4PU | DCCIV16PU | DCCIV64PU | Data Cache Clean & Invalidate to point Unification |
| DCZVA | DCZV4P | DCZV16P | DCZV64P | Data Zero |
| ICIVAU | ICIV4PU | ICIV16PU | ICIV64PU | Instruction Cache Invalidate to point Unification |
| ICIVAIS | ICIV4PIS | ICIV16PIS | ICIV64PIS | Instruction Cache Invalidate to point Inner Sharable |

The left hand column shows instructions which specify a single virtual address (VA) for which cache maintenance is to be provided. The next three columns show corresponding instructions corresponding to different page sizes, which each specify a virtual page address to trigger cache maintenance for each address within that page. The final column describes the cache maintenance operation to be performed.

The point of unification, point of coherency and point inner shareable refer to the level of the memory system to which clean or invalidate operations are to be performed. Some operations may only require data at certain levels of the cache hierarchy to be made coherent, while others may require deeper coherency right down to memory. The point of unification, point of coherency and point inner shareable may be defined by control parameters within a control register for example, to allow some configuration of the point to which coherency is enforced.

The point of coherency for a particular virtual address is the point at which all agents that can access memory are guaranteed to see the same copy of the memory location. In many cases this may effectively be the main system memory, although other systems may implement caches beyond the point of coherency that have no effect on the coherence between memory system agents, in which case the point of coherency may be a cache. The point coherency is the last level of cache/memory which is cleaned or invalidated in response to one of the point coherency cache maintenance instructions shown above.

The point of unification for a particular processing element (such as the processor 4) is the point by which the instruction and data caches and the translation table walks for that processing element are guaranteed to see the same copy of a memory location. In many cases, the point of unification may be the point in a uniprocessor memory system by which the instruction and data caches and the translation table walks have merged. The point of unification is the last level of cache or memory which is cleaned or invalidated in response to one of the point unification cache maintenance instructions shown above.

The point inner sharable applies to refer to a particular group of processing elements designated as an "inner shareable shareability domain" within a multi-processor system, and the point inner shareable refers to the point by which the instruction and data caches and the translation table walks of all the processing elements within the inner shareable domain are guaranteed to see the same copy of a memory location. The point inner shareable is the last level of cache that is invalidated in response to the point inner sharable instruction cache invalidation instruction shown above.

There are a number of use cases for which instructions for performing cache maintenance across an entire virtual page may be very useful. For example:

Non-Coherent DMA (Direct Memory Access)

Before and after DMA operations memory buffers and caches may need to be made consistent. This may require a cache clean before DMA, and then a cache invalidate after the DMA completes. A current real world example would be transferring 1080p HD images to and from a GPU for OpenCL image processing, each image frame may be ~8 Mbytes in size. In the worst case, very little of the image will be in any cache since the buffer is many times larger than all the caches. With cache maintenance instructions specifying a single virtual address, this would result in 128K×64 byte cache line operations. Using page based operations the CPU work can be reduced by orders of magnitude and the cache maintenance can be optimized within the caches and memory system. Depending page sized used, an 8 MByte buffer could be processed using 2048×4K cache page operations, 512×16K cache page operations, or 128×64K cache page operations.

Zero Filling Memory

Many operating systems and hypervisors zero fill memory pages, for security reasons, before mapping them to clients. A page based memory zero could operation could ultimately happen directly in the memory device, along with a broadcast page invalidate.

Dynamic Code Loading

When code is loaded into RAM, the instruction caches may have to be synchronized with the data caches, and memory. Small updates can be done by VA line operations, but large changes currently result in invalidating the entire instruction cache. Invalidation by page would remove the impacts of total instruction cache invalidation from independently executing code.

Hence, in these use cases and others, the virtual page address based cache maintenance instructions can provide a number of advantages over virtual address based cache maintenance instructions or dedicated custom flush engines, including:

Higher level system software intent is expressed to SoC fabric and components, to allow for optimized implementations.

Architected instructions will be used by future OS kernel code

Only one MMU translation and permission check required for the designated page

Atomic page operations do not need locks or status tracking (operations may need to complete in time, with respect to memory ordering and barriers)

Figure 9:
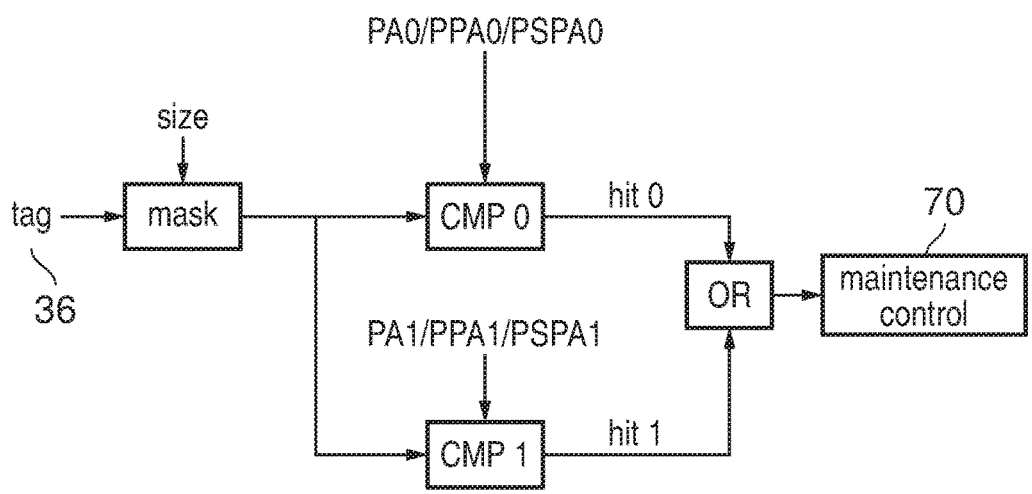

Operating Systems preemption during cache operations will be handled transparently No asynchronous errors Designed for multiprocessor and coherent memory systems hardware or fabric could consume multiple invalidations and resolve by one sweep through a cache (see FIG. 9 below).

There are several options for implementing the cache maintenance instructions of the type shown above within a particular system.

Figure 5:
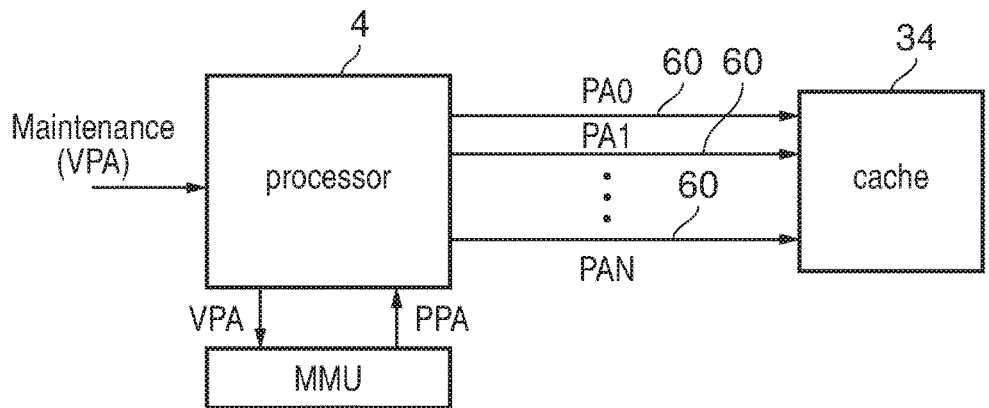
FIGS. 5 to 7 show three examples of performing a cache maintenance operation in response to a cache maintenance instruction specifying a virtual page address.

FIG. 5 shows a first example in which the page based cache maintenance operation is decomposed by the processor 4 into a number of individual micro-operations corresponding to individual addresses. The processor 4 receives the virtual page address (VPA) based cache maintenance instruction, and triggers the MMU 24 to translate the virtual page address into a physical page address (PPA). The processor 4 maps the page operation into a number of individual cache maintenance commands 60 each corresponding to a respective physical address (PA0, PA1, . . . PAN) within the page identified by the MMU, and the commands 60 are sent to the cache 34. The cache 34 responds to each command 60 by looking up the cache for the specified physical address and performing the required cache maintenance operation if a matching cache line is found. This approach can allow the architectural provision of the VPA cache maintenance instruction to be supported even if the cache itself can only handle commands specifying individual addresses. For example a small state machine within the CPU could generate the sequential cache line operations. Alternatively, rather than performing address translation before generating the individual command 60, the processor 4 could generate sequential cache line operations by virtual address and then each of those operations could trigger a translation in the MMU to determine the physical address to be sent to the cache.

Figure 6:
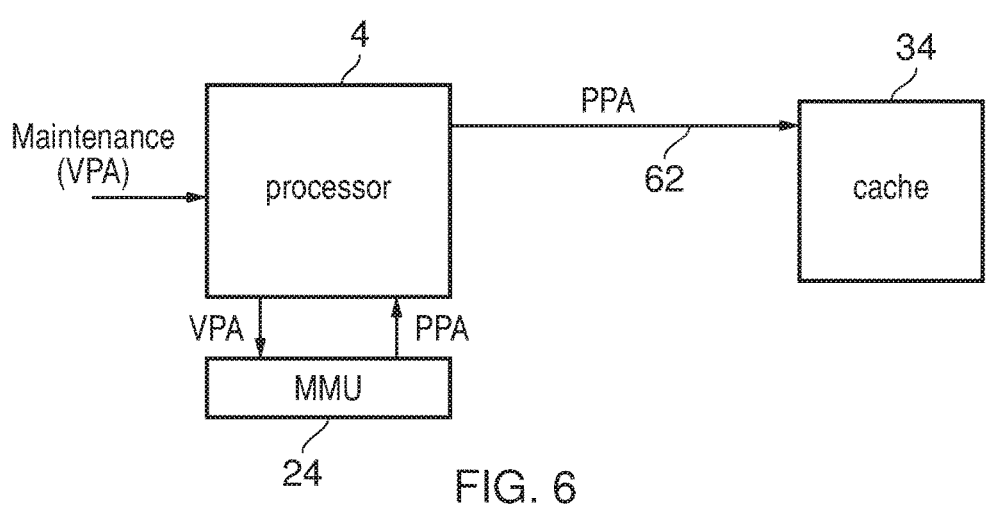

FIG. 6 shows another example in which a command for an entire page is sent to the cache. In this case the processor 4 executes the cache maintenance instruction specifying the VPA and the VPA is translated into a PPA using the MMU and then a command 62 specifying the PPA is sent to the cache. The cache may then determine which cache lines store data having a physical address within the specified page and can initiate the cache maintenance operations for each cache line identified. This approach has several advantages compared to FIG. 5. Firstly, the command bandwidth is reduced so that fewer commands need to be transmitted between the processor and the cache. Also, this approach may allow a single sweep through the tags of each cache line to identify whether the cache contains any data within the specified physical page address, rather than requiring separate lookups for each address as in FIG. 5, which helps to reduce power consumption and response time.

Figure 7:
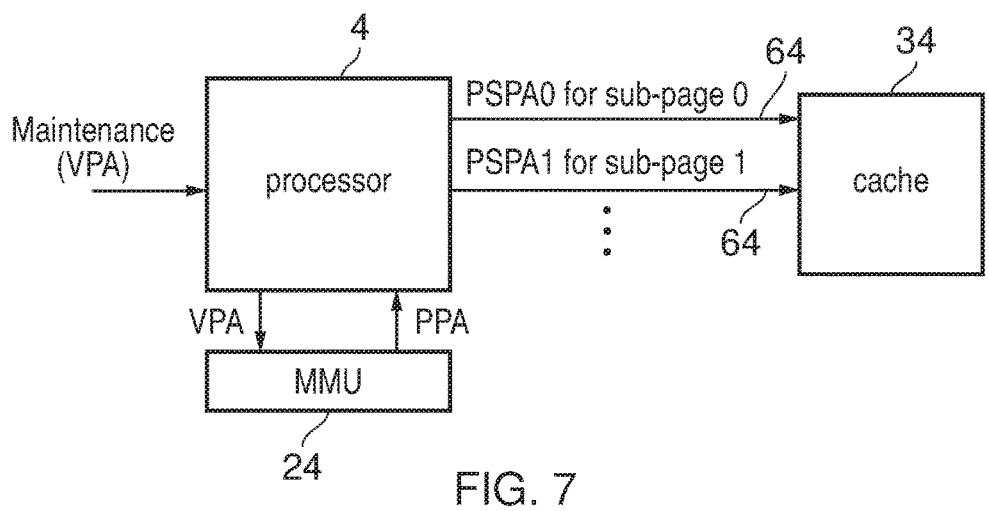

Alternatively, as shown in FIG. 7, page operations could be decoded and dispatched as a number of smaller cache micro operations. For example, an implementation could turn 64K page operations into sixteen 4K operations, or convert 4K page operations into 64 operations of 64 bytes each. Hence, in FIG. 7, the cache maintenance instruction is mapped to a number of commands 64 specifying a block of physical addresses (e.g. a sub-page address) within the physical page corresponding to the virtual page specified in the instruction, and each command then triggers the cache 34 to identify cache lines corresponding to the specified block of addresses and to perform cache maintenance on the identified cache lines.

While FIGS. 5 to 7 show examples of sending commands to one cache, in systems comprising multiple caches the commands may be broadcast to each cache or to a subset of the caches, and each cache may respond by checking whether it has any data for the required addresses and perform cache maintenance if required.

Figure 8:
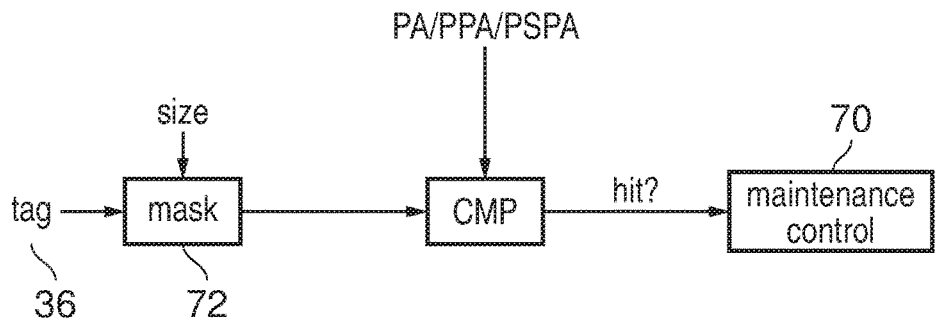
FIGS. 8 and 9 show examples of identifying which cache lines store data with physical addresses within the physical page corresponding to a virtual page specified by the cache maintenance instruction.

FIG. 8 shows an example of how to determine which cache lines store data corresponding to a specified physical address (PA—FIG. 5), a specified physical page address (PPA—FIG. 6) or specified physical sub-page address (PSPA—FIG. 7). The cache 34 may scan through each cache line and compare the tag 37 of the cache line against the PA, PPA or PSPA received in the command 60, 62, 64. For the examples in FIGS. 6 and 7, a mask 72 may be applied to the tag to mask out any bits of the tag which are less significant than the least significant bit of the page address or sub-page address. For example, a size parameter may be used to identify which bits should be masked. If the masked tag matches the specified address, page address or sub-page address, then a hit signal may be generated and the control circuitry 70 may trigger cache maintenance to be performed for any lines for which a hit was found.

Sometimes the cache may receive several cache maintenance commands. To reduce the overhead of cache lookup, multiple commands corresponding to the same type of cache maintenance operation may be grouped together and then processed using a single sweep through the cache. For example, as shown in FIG. 9, the (masked) tag value of each cache line may be compared in parallel against the addresses, page addresses or sub-page addresses of several cache maintenance commands, and the hit signals for each command may be ORed to identify whether the cache maintenance operation should be performed for the corresponding cache line. While FIG. 9 shows performing comparisons for two commands at a time, it will be appreciated that this could be done for more. In this way, with a single lookup of each cache line two or more cache maintenance commands can be processed simultaneously.

In some cases the memory system 16 may include a memory controller 17 which may be able to locally process some commands, such as a data zero operation. In this case a command may be sent to the memory, in addition to the cache.

In some cases the cache may only be able to process commands at a certain rate, and may only have the finite buffer for storing cache maintenance commands. Therefore the processor 4 may apply some back pressure to limit the issuing of cache maintenance operations faster than the cache or the memory system can process them.

Figure 10:
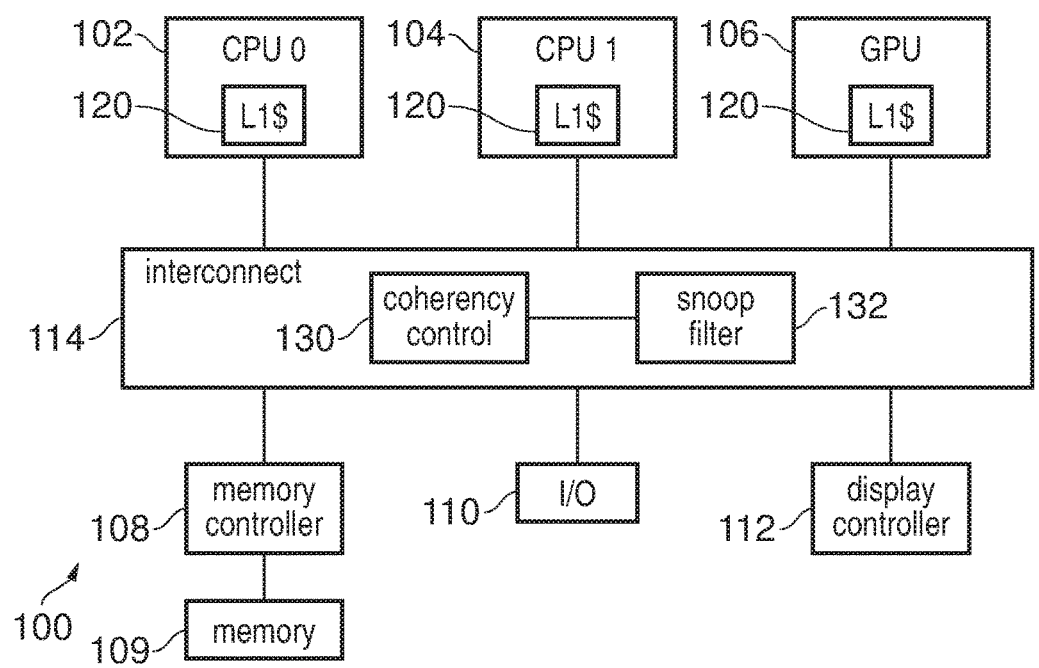
FIG. 10 shows an example of an apparatus comprising several caches with a snoop filter tracking the data stored in each cache.

FIG. 10 shows another example of a data processing apparatus 100 including multiple processing elements which may each have a cache. For example, the processing elements may include two central processing units (CPUs) and a graphics processing unit (GPU) 106 each of which may be configured in a similar way to the processor 4 shown in FIG. 1. The apparatus may also include a memory controller 108 (e.g. a DMA unit), an input/output unit 110 for communicating with a peripheral or external device such as an Ethernet interface for example, and a display controller 112 for controlling display of data on a display device. It will be appreciated that many other types of devices could be connected. An interconnect connects the devices and maintains coherency between different data versions stored by each device.

The CPUs and GPU each have a local cache 120 and the interconnect 114 may include coherency control circuitry 130 for maintaining coherency between the data in the caches 120. A snoop filter 132 may be provided within the interconnect 114 to track which data is stored by each cache 120. When one of the processing elements initiates an access to a particular address, the snoop filter 132 can determine whether any of the other caches stores data for that address, and if so initiate snoop operations for checking the coherency status of the data in the other caches. Any known coherency protocol may be used to maintain coherency, for example the AMBA® ACE protocol provided by ARM® Limited.

When performing cache maintenance operations identified by virtual page address as discussed above, then the snoop filter 132 can be useful for reducing the amount of cache searching required. In general, when a cache maintenance operation is issued then this may be broadcast throughout the coherent fabric so that the data is cleaned or invalidated in any of the caches in which the data may be stored. However, often the page size may be relatively large and caches may be relatively small and so there is a reasonable probability that a certain cache may not store any data from the page specified in the instruction. To reduce the overhead of searching, the snoop filter 132 can be used to determine whether it is necessary to forward the cache maintenance commands to each cache, so that only the caches which are identified as storing data from the specified page are looked up. The coherency controller 130 may prevent transmission of cache maintenance commands to caches which are not indicated in the snoop filter 132 as storing data from that page, so that the bandwidth and control overhead associated with transmitting and tracking the commands, and the overhead of searching the cache to determine whether it holds the required data, can be reduced.

Figure 11:
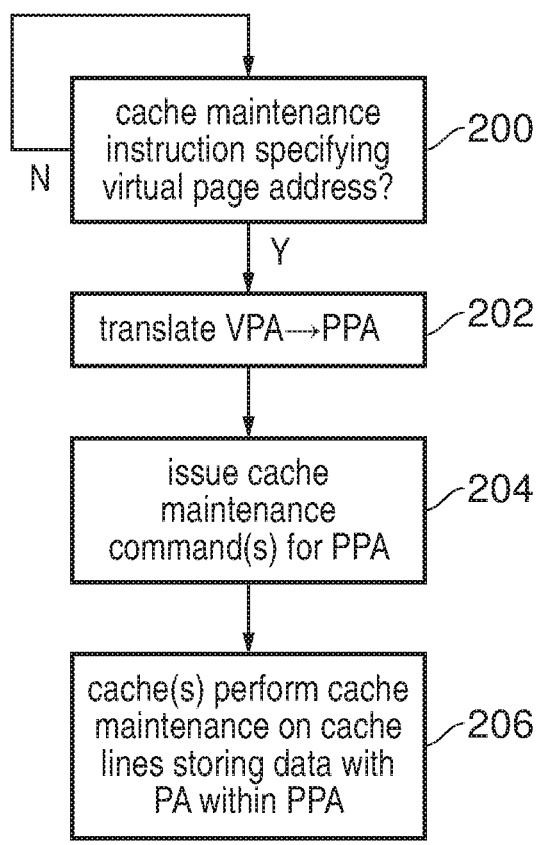
FIG. 11 shows a method of data processing.

FIG. 11 shows a method of data processing. At step 200 the processing circuitry determines whether a cache maintenance instruction specifying a virtual page address has been encountered. If so then at step 202 the virtual page address is translated into a physical page address of a physical page by the MMU 24. At step 204 one or more cache maintenance commands are issued to the cache for addresses within that physical page (this could be done with any of the examples shown in FIGS. 5 to 7). At step 206 the cache performs cache maintenance on any cache lines which are identified as storing data having a physical address which relies within the physical page that corresponds to the specified virtual page address of the cache maintenance instruction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
instruction fetch circuitry to fetch instructions from a memory system;
processing circuitry to perform data processing in response to the instructions fetched by the instruction fetch circuitry;
at least one cache to store cached versions of data from a memory of the memory system; and
translation circuitry to translate a virtual page address into a physical page address of a physical page;
wherein the translation circuitry comprises a plurality of translation entries, each translation entry corresponding to a virtual page address and identifying the corresponding physical page address for that virtual page address;
wherein in response to a cache maintenance instruction fetched by the instruction fetch circuitry and specifying a given virtual page address identifying a given virtual page of a virtual address space, the processing circuitry triggers the at least one cache to perform a cache maintenance operation on any cache lines for which a physical address of data stored by a cache line is within a given physical page that corresponds to the given virtual page identified by the given virtual page address;
wherein performing the cache maintenance operation includes only a single lookup of the translation circuitry to translate the given virtual page address to a physical page address of the given physical page in order to perform the cache maintenance operation for the entire given physical page;
wherein said physical address of data stored by the cache line is the physical address in the memory at which the corresponding data is stored for which the data stored in the cache line is a cached version; and
wherein the cache maintenance instruction specifies one of a plurality of virtual page sizes, and in response to at least some cache maintenance instructions, the processing circuitry is configured to trigger issuing of a plurality of cache maintenance commands to said at least one cache, each cache maintenance command corresponding to a different block of physical addresses within the physical page corresponding to the virtual page identified by the virtual page address to perform the cache maintenance operation with the virtual page having the virtual page size specified by the cache maintenance instruction.

2. The apparatus according to claim 1, wherein the cache maintenance operation comprises one of:
a clean operation to write dirty data stored by said any cache lines to at least one further data store;
an invalidate operation to invalidate the data stored by said any cache lines;
a clean and invalidate operation to write dirty data stored by said any cache lines to at least one further data store and invalidate the data stored by said any cache lines; and
a setting operation to set the data stored by said any cache lines to a predetermined value.

3. The apparatus according to claim 1, wherein in response to the cache maintenance instruction, the processing circuitry is configured to trigger issuing of a plurality of cache maintenance commands to said at least one cache, wherein each cache maintenance command specifies a physical address within the physical page corresponding to the virtual page identified by the virtual page address and is for controlling said at least one cache to perform the cache maintenance operation on a cache line storing data having the specified physical address.

4. The apparatus according to claim 1, comprising said at least one cache, wherein said at least one cache is responsive to the cache maintenance command to identify which cache lines store data for physical addresses within the block specified by the cache maintenance command, and to perform the cache maintenance operation on the identified cache lines.

5. The apparatus according to claim 4, wherein said at least one cache is configured to check, for each of a plurality of cache lines, whether the cache line stores data for a physical address within the block specified by the cache maintenance command.

6. The apparatus according to claim 4, wherein in response to a plurality of the cache maintenance commands, the at least one cache is configured to check, for each of a plurality of cache lines, whether the cache line stores data for a physical address within any of the blocks of physical addresses specified by the plurality of cache maintenance commands.

7. The apparatus according to claim 1, comprising a plurality of caches, wherein the processing circuitry is responsive to the cache maintenance instruction to trigger at least some of the plurality of caches to perform the cache maintenance operation.

8. The apparatus according to claim 7, comprising a snoop filter to store data identifying which caches store data for corresponding physical addresses, wherein in response to the cache maintenance instruction, the snoop filter is to identify one or more caches which store data for physical addresses within the physical page corresponding to the virtual page identified by the virtual page address specified by the cache maintenance instruction; and
control circuitry configured to inhibit transmission of cache maintenance commands to caches other than said one or more caches identified by the snoop filter.

9. The apparatus according to claim 1, wherein the processing circuitry is responsive to at least some cache maintenance instructions to transmit a command to a memory controller for controlling at least one memory, and the memory controller is responsive to the command to control performance of the cache maintenance operation by the at least one cache.

10. An apparatus comprising:
instruction fetch means to fetch instructions from a memory system;
processing means for performing data processing in response to the instructions fetched by the instruction fetch circuitry; and
means for storing cached versions of data from a memory of the memory system; and translation means to translate a virtual page address into a physical page address of a physical page;

wherein the translation means comprises a plurality of translation entries, each translation entry corresponding to a virtual page address and identifying the corresponding physical page address for that virtual page address;

wherein in response to a cache maintenance instruction fetched by the instruction fetch circuitry and specifying a given virtual page address identifying a given virtual page of a virtual address space, the processing means is configured to trigger the means for storing cached versions of data from the memory to perform a cache maintenance operation on any cache lines for which a physical address of data stored by a cache line is within a given physical page that corresponds to the given virtual page identified by the given virtual page address;

wherein performing the cache maintenance operation includes only a single lookup of the translation means to translate the given virtual page address to a physical page address of the given physical page in order to perform the cache maintenance operation for the entire given physical page;

wherein said physical address of data stored by the cache line is the physical address in the memory at which the corresponding data is stored for which the data stored in the cache line is a cached version; and wherein the cache maintenance instruction specifies one of a plurality of virtual page sizes, and in response to at least some cache maintenance instructions, the processing means is configured to trigger issuing of a plurality of cache maintenance commands to said means for storing cached versions of data from the memory, each cache maintenance command corresponding to a different block of physical addresses within the physical page corresponding to the virtual page identified by the virtual page address to perform the cache maintenance operation with the virtual page having the virtual page size specified by the cache maintenance instruction.

11. A method of data processing comprising:

fetching cache maintenance instructions from a memory system;

receiving a cache maintenance instruction fetched from the memory system and specifying a virtual page address identifying a virtual page of a virtual address space; and in response to the cache maintenance instruction, triggering at least one cache that stores cached versions of data from a memory to perform a cache maintenance operation on any cache lines for which a physical address of data stored by a cache line is within a physical page that corresponds to the virtual page identified by the virtual page address;

wherein said physical address of data stored by the cache line is the physical address in the memory at which the corresponding data is stored for which the data stored in the cache line is a cached version;

wherein performing the cache maintenance operation includes only a single lookup of translation circuitry to translate the virtual page address to a physical page address of the physical page in order to perform the cache maintenance operation for the entire given physical page; and wherein the cache maintenance instruction specifies one of a plurality of virtual page sizes, and in response to at least some cache maintenance instructions, the at least one cache is triggered to issue a plurality of cache maintenance commands to the at least one cache, each cache maintenance command corresponding to a different block of physical addresses within the physical page corresponding to the virtual page identified by the virtual page address to perform the cache maintenance operation with the virtual page having the virtual page size specified by the cache maintenance instruction.

* * * * *